J. A. Lee,
Cage Trap,
Nº 83,642.    Patented Nov. 3, 1868.
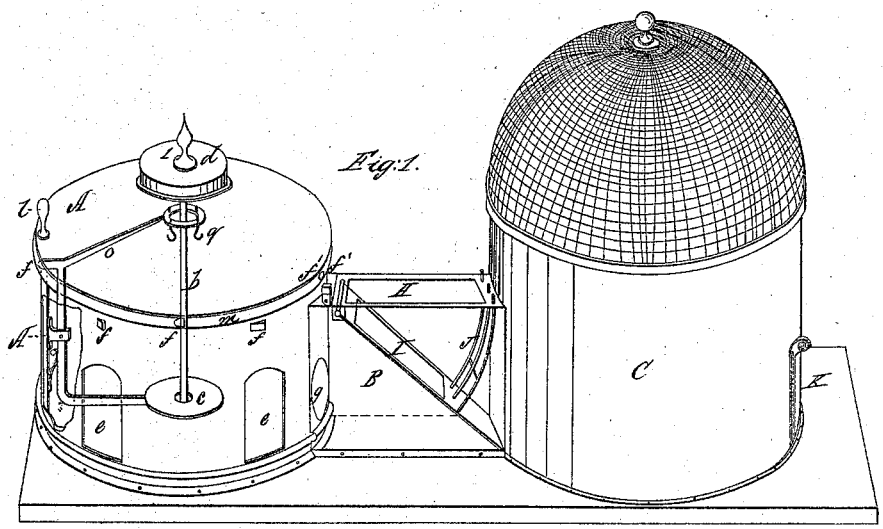
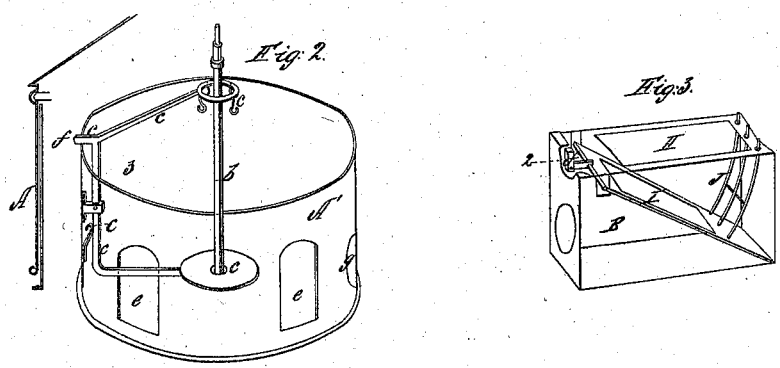
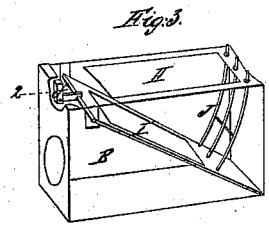
Witnesses:
Inventor:
John A. Lee

UNITED STATES PATENT OFFICE.

JOHN A. LEE, OF CHATTANOOGA, TENNESSEE.

IMPROVED ANIMAL-TRAP.

Specification forming part of Letters Patent No. 83,642, dated November 3, 1868.

*To all whom it may concern:*

Be it known that I, JOHN A. LEE, of Chattanooga, in the county of Hamilton and State of Tennessee, have invented a new and useful machine for catching animals, fowls, and fish, which I denominate an "Animal, Fowl, and Fish Trap;" and I do hereby declare the following is a full, clear, and exact description of the same, reference being had to the annexed drawings, making a part of this specification, in which—

Figure 1 is a perspective view. Fig. 2 is a view of the inside of the trap, showing the arrangement of the platform, bait-hooks, trigger, ratchet, and springs, with inside stationary drum, also upright shaft on which outside drum revolves. Fig. 3 shows hall or entrance from trap to prison, together with glass gate and wire screen, with ratchet-trigger at upper end of gate.

Fig. 1, outside view of trap, revolving on upright shaft $b$, with hall and prison. A, outside revolving cylinder on stationary drum, (shown in Fig. 2;) B, hall or passage from trap to prison or net; C, prison or net; $d$, mainspring, box, and nut; $e\ e$, entrances to trap; $f\ f\ f$, ratchet-catches on the outside and inside, also groove $m$; $g$, entrance to prison; H, glass to admit light; I, drop-glass, inclined gate, or door; J, wire grating to prevent the imprisoned animals from getting on door; K, glass window or door to discharge prisoners and admit light straight to trap.

Fig. 2, A′, inside cylinder or drum, stationary, around which drum A, Fig. 1, revolves; $b$, shaft through center. $q$, $o$, and $c$ are bait-hooks, ratchet-trigger, spring, and platform, respectively fastened on the inside of stationary drum; $f$, ratchet-trigger, working in groove $m$ at $f$, Fig. 1.

Fig. 3, B, hall-entrance and drop-glass gate, with ratchet $f$, and drop I, and wire grating J.

Nos. 1, 2, 3, mainspring, triggers, and drop, each separate.

To wind up the trap, turn the outside cylinder six or seven revolutions to the right by means of the knob $l$ on the top, the trigger serving as ratchet or click. The trap is thus set for about thirty entrances, and is thrown by touching the platform or pulling at the bait, which closes the entrance and all means of escape in that direction, at the same time opening a place of exit by the hall, and the animal, seeing light in that direction, hastily darts through, lifting glass gate with wire grating, and, in doing so, springs the trap again, shuts the hole behind him, setting the trap for another, and finds himself securely in prison, with no means of escape whatever.

To bait the trap, first run down the spring, then unscrew the nut at top, and take off the outside drum, which exposes the four hooks, which bait. In reaching for the bait the animal will almost surely step on the platform and spring the trap without touching the bait.

Any number of entrances may be made, varying with the size of the trap.

For fish, a bag-net is attached instead of the prison.

I claim as my invention—

1. The two concentric drums A and A′, one stationary and the other rotating by means of a coiled spring upon the upright axis $b$, when in combination with the platform $c$, spring-trigger $o$, and bait-hooks $q$, as and for the purposes set forth.

2. The combination and arrangement of the glass gate I and wire grating J and pawl $f'$ with the lugs $f$ upon the outside drum A, as and for the purposes set forth.

JOHN A. LEE.

Witnesses:
T. R. STANLEY,
R. S. WATKINS.